United States Patent
Bauer et al.

(10) Patent No.: US 11,411,916 B2
(45) Date of Patent: Aug. 9, 2022

(54) METHOD AND TRANSMISSION APPARATUS FOR TRANSMITTING DATA BETWEEN TWO NETWORKS

(71) Applicant: Siemens Mobility GmbH, Bayern (DE)

(72) Inventors: Christian Bauer, Munich (DE); Rainer Falk, Poing (DE); Matthias Seifert, Buchholz (DE); Martin Wimmer, Neubiberg (DE)

(73) Assignee: SIEMENS MOBILITY GMBH

( * ) Notice: Subject to any disclaimer, the term of this patent is extended or adjusted under 35 U.S.C. 154(b) by 28 days.

(21) Appl. No.: 16/816,317

(22) Filed: Mar. 12, 2020

(65) Prior Publication Data
US 2020/0304465 A1 Sep. 24, 2020

(30) Foreign Application Priority Data
Mar. 19, 2019 (EP) .................................... 19163812

(51) Int. Cl.
*H04L 9/40* (2022.01)
*H04L 67/141* (2022.01)
*H04L 67/146* (2022.01)

(52) U.S. Cl.
CPC ........ *H04L 63/0236* (2013.01); *H04L 67/141* (2013.01); *H04L 67/146* (2013.01)

(58) Field of Classification Search
None
See application file for complete search history.

(56) References Cited

U.S. PATENT DOCUMENTS

| | | | |
|---|---|---|---|
| 2008/0040789 A1* | 2/2008 | Chen ................... | H04L 63/0227 726/12 |
| 2012/0017079 A1 | 1/2012 | Mraz et al. | |
| 2015/0180977 A1* | 6/2015 | Riedel ..................... | G06F 9/451 715/719 |
| 2015/0215075 A1* | 7/2015 | Baek ....................... | H04L 63/18 726/4 |

(Continued)

FOREIGN PATENT DOCUMENTS

| | | |
|---|---|---|
| CN | 101127761 A | 2/2008 |
| CN | 103491072 A | 1/2014 |

(Continued)

OTHER PUBLICATIONS

Anonymous: "Session (computer science) Wikipedia", XP055605935, Gefunden im Internet: URL:https://en.wikipedia.org/w/index.php?title=Session (computer science)&oldid=877359736 Seite 1; 2019.

(Continued)

*Primary Examiner* — Scott B Christensen
(74) *Attorney, Agent, or Firm* — Schmeiser, Olsen & Watts LLP

(57) ABSTRACT

Provided is a computer-implemented method and a transmission apparatus for transmitting data between a first network and a second network having high and low security requirements, wherein a first session is set up between the first and second networks, a first data packet is transmitted from a transmitting unit in the first network via a first one-way communication unit to a receiving unit in the second network, and a second session is set up and a second data packet is transmitted from a transmitting unit in the second network via a second one-way communication unit to a validation unit, the second data packet is validated in the validation unit on a prescribed rule, positive validation of the second data packet results in a third session being set up, and the second data packet is transmitted from the validation unit to a receiving unit in the first network.

13 Claims, 6 Drawing Sheets

(56) References Cited

U.S. PATENT DOCUMENTS

| | | | |
|---|---|---|---|
| 2015/0256512 A1* | 9/2015 | Leconte | H04L 63/0209 |
| | | | 726/1 |
| 2016/0301695 A1* | 10/2016 | Trivelpiece | H04L 63/0876 |
| 2018/0124121 A1 | 5/2018 | Blöcher et al. | |
| 2018/0351914 A1* | 12/2018 | Jobson | H04L 63/105 |
| 2019/0149557 A1* | 5/2019 | Falk | H04L 63/123 |
| | | | 713/168 |
| 2020/0099658 A1* | 3/2020 | Couillard | G06F 21/606 |
| 2020/0120071 A1* | 4/2020 | Wimmer | H04L 69/165 |
| 2020/0412722 A1* | 12/2020 | Al Amer | H04L 63/1408 |

FOREIGN PATENT DOCUMENTS

| | | |
|---|---|---|
| CN | 104023013 A | 9/2014 |
| CN | 106060003 A | 10/2016 |
| DE | 102015205833 A1 | 10/2016 |
| EP | 3425865 A1 | 1/2019 |

OTHER PUBLICATIONS

AU Decision to Grant dated May 6, 2021 for Application No. 2020201998.

Anonymous: "Protocol data unit—Wikipedia"; Mar. 6, 2019 (Mar. 6, 2019), XP055882085; Gefunden im Internet URL:https://en.wikipedia.org/w/index.php?title-Protocol data unit&oldid=886473409.

Anonymous: "Transmission Control Protocol—Wikipedia"; Jul. 31, 2018 (Jul. 31, 2018), XP055623931; Gefunden im Internet: URL:https://de.wikipedia.org/w/index.php?title=Transmission Control Protocol&oldid=179596123.

\* cited by examiner

METHOD AND TRANSMISSION APPARATUS FOR TRANSMITTING DATA BETWEEN TWO NETWORKS

CROSS-REFERENCE TO RELATED APPLICATIONS

This application claims priority to European Application No. 19163812.1, having a filing date of Mar. 19, 2019, the entire contents of which are hereby incorporated by reference.

FIELD OF TECHNOLOGY

The following relates to a computer-implemented method and to a transmission apparatus for transmitting data between a first network having a high security requirement and a second network having a low security requirement, the respective communication being realized in unidirectional fashion, in particular.

BACKGROUND

Secure communication between a security-critical network and an open network, such as e.g. an industrial control network (or operational network) and a conventional IT network, can involve for example one-way communication units, such as e.g. data diodes, being used to allow a unidirectional data transmission. A data diode having a feedback channel, also referred to as a bidirectional network guard or security gateway, allows a secure data transfer between two information areas having different security levels. A network guard is normally a combination of hardware and software and allows more functionality than firewalls.

A bidirectional network guard is normally designed to realize two separate unidirectional data streams by means of one data diode each, the data streams flowing in opposite directions. This permits an interchange of data in both directions, with the one-way function being ensured in each case. By way of example, a bidirectional network can be used to convey guard data from a network having a high security requirement to an open network having a low security requirement or from the network having a low security requirement to a network having a high security requirement.

If a data transfer between networks having different security requirements is supposed to be performed reliably, i.e. correctly, completely and in a manner meeting the security requirements, there is normally a need for additional transfer acknowledgements, which are interchanged between the networks. A "reliable" or "dependable" data transfer can be understood to mean in particular a complete and error-free data transfer.

A data transfer from the network having a low security requirement to the network having a high security requirement normally requires an additional check to ensure the integrity and/or security of the network having a high security requirement and/or the network availability.

SUMMARY

An aspect relates to a respective unidirectional data transfer both with and without acknowledgement of the data transmission flexibly for a data interchange between two networks having different security requirements, a data transmission from one to the other network.

According to a first aspect, embodiments of the invention relates to a computer-implemented method for transmitting data between a first network having a high security requirement and a second network having a low security requirement, wherein a) a data transmission from the first network to the second network involves a first session being set up between the first network and the second network and a first data packet being transmitted from a transmitting unit in the first network via a first one-way communication unit, arranged between the first network and the second network, to a receiving unit in the second network, and b) a data transmission from the second network to the first network involves a second session being set up and a second data packet being transmitted from a transmitting unit in the second network via a second one-way communication unit to a validation unit arranged between the first network and the second network, the second data packet is validated in the validation unit on the basis of a prescribed rule, and positive validation of the second data packet results in a third session being set up and the second data packet being transmitted from the validation unit to a receiving unit in the first network.

"Computer-implemented" can be understood in association with embodiments of the invention to mean an implementation of the method in which in particular a processor carries out at least one method step.

According to a second aspect, embodiments of the invention relates to a transmission apparatus for transmitting data between a first network having a high security requirement and a second network having a low security requirement, comprising a first receiving unit and a first transmitting unit, which are each arranged in the first network, a second receiving unit and a second transmitting unit, which are each arranged in the second network, a first one-way communication unit, which is arranged between the first network and the second network and set up to transmit a data packet in the event of a data transmission from the first transmitting unit to the second receiving unit, a second one-way communication unit, arranged between the second network and the first network, for a data transmission from the second to the first network, and a validation unit, which is arranged between the second and first networks and set up to validate a data packet on the basis of a prescribed rule in the event of a data transmission from the second transmitting unit to the first receiving unit.

It is an advantage of embodiments of the present invention that a flexible transmission apparatus and a transmission protocol are provided that allow a secure data transmission from the network having a high security requirement to the network having a lower security requirement and vice versa both with and without acknowledgement of the performance or completeness of the data transmission. It is in particular possible for the requirement to protect the first network from undesirable data traffic from the second network to be met.

It is possible in particular for one check per session to be performed for a transmission, so that fewer control data packets are conveyed. In this way, the overhead can be reduced. A further advantage of the embodiments of invention is that a protocol is defined that can be used for both unidirectional and bidirectional data transmissions.

The validation unit allows the data traffic from the second network to the first network to be validated and thereby controlled. The data transmission from the first to the second network is performed using a unidirectional data connection and without validation.

Negative validation of a data traffic from the second to the first network can result in particular in just one data packet, for example a control data packet, being created by the validation unit and transmitted back to the second network. This allows information about a transmission error or manipulation of the data to be conveyed to the original transmitter.

The first one-way communication unit allows a unidirectional data transmission. The first one-way communication unit can be configured for example as a data diode or as an eavesdropping device that merely passively eavesdrops on a data traffic and forwards the overheard data.

The data transmission from the first to the second network and from the second network to the first network are each in unidirectional form.

At least one data packet or multiple data packets can be transmitted per session.

In one advantageous embodiment of the computer-implemented method, at least one data packet can be transmitted between the receiving unit and the transmitting unit in the first network and/or between the receiving unit and the transmitting unit in the second network.

It is possible in particular for acknowledgement messages to be transmitted between the respective transmitting and receiving units. This allows in particular a return channel to be realized without adversely affecting the freedom from interaction of the individual transmission paths between the networks. By way of example, a response to a data packet sent from the first network to the second network can be returned to the first network via the validation unit. The data transmission takes place unidirectionally via a one-way communication unit in each case.

In one advantageous embodiment of the computer-implemented method, a first or second data packet can be configured as a payload data packet or as a control data packet.

In particular, at least one control data packet and at least one payload data packet can be transmitted per session. A payload data packet comprises payload data, whereas a control data packet comprises for example information pertaining to the performance of a acknowledgement of reception and/or a check on the completeness of the transferred payload data. In addition, a control data packet can prompt setup of a session.

In one advantageous embodiment of the computer-implemented method, if the validation of the second data packet in the validation unit has a negative outcome, a control data packet can be issued by the validation unit and the control data packet can be transmitted via the first network to the second network.

In this way, a data transmission from the second to the first network can easily be prevented. The second data packet can be a control or payload data packet in particular. The control data packet issued by the validation unit can comprise for example information about the validation, such as e.g. a check result.

In one advantageous embodiment of the computer-implemented method, a payload data packet of a session can be assigned a unique session identifier.

The structure or data structure of a payload data packet comprises payload data and a session identifier. The structure can additionally comprise in particular a data packet identification identifier, a checksum of the data packet, type information and/or an application identification number.

In one advantageous embodiment of the computer-implemented method, the control data packet can be assigned a session identifier, a data packet identification identifier and transmitter and/or receiver information.

The structure of a control data packet can, in addition, comprise in particular a checksum of the control data packet, a data packet identification identifier assigned to the control data packet, type information, at least one flag and/or information about the size of the data transmission of the respective session.

In one advantageous embodiment of the computer-implemented method, a data transmission can involve a control data packet being transmitted before the transmission of a payload data packet.

In particular, a data transmission between the first and second networks can be performed with acknowledgement of a correctly performed data transmission, at least one control data packet being conveyed per session. The control data packet can in particular comprise information pertaining to the setup or finishing of a session. It is possible for more than one payload data packet per session to be conveyed. A transmission with acknowledgement has the advantage, in particular, that a dependable transmission can be ensured.

In one advantageous embodiment of the computer-implemented method, acceptance of the control data packet can result in a payload data packet being transmitted and non-acceptance of the control data packet can result in the data transmission being terminated and just a further control data packet being transmitted back.

A control data packet can in particular comprise a flag for setup of a session. Acceptance of the control data packet by the receiver can result in a session being set up and at least one payload data packet being transmitted. Nonacceptance of the control data packet can result in a further control data packet being returned to the respective transmitter. The check for acceptance of a data packet can be performed in particular in a receiving unit of a network.

In one advantageous embodiment of the computer-implemented method, a data transmission from the first network to the second network can involve
  a first control data packet being transmitted from the first network to the second network,
  the first control data packet being checked in the second network for acceptance,
  and, if the first control data packet is accepted, a second control data packet can be transmitted from the second network to the validation unit, validated there and, in the event of positive validation, transmitted to the first network, and at least one payload data packet can be transmitted from the first network to the second network, and a third control data packet can be transmitted from the first network to the second network.

The third control data packet is conveyed in particular after all payload data packets of the session have been sent. If the first control data packet is not accepted, the data transmission can be terminated and just a control data packet, for example comprising information about a transmission error or manipulation of the data, can be transmitted to the first network.

In one advantageous embodiment of the computer-implemented method, the first and third control data packets can be used to check a completeness of the transmitted payload data packet in the second network, and a fourth control data packet comprising the result of the check can be transmitted to the first network.

In particular, a transmission of the payload data can be followed by a completeness check and a check for transmission errors or distortions being performed on the basis of the control data packets conveyed at the beginning and end of the session. By way of example, it is possible to check whether a receiver has received the transfer data volume announced in the first control data packet, i.e. the same transfer data volume is indicated in the third control data packet. In this way, for example transmission errors can be detected and in particular returned to the original transmitter.

In one advantageous embodiment of the transmission apparatus,
- the first receiving unit and the first transmitting unit can be set up on a first component in the first network,
- the second receiving unit and the second transmitting unit can be set up on a second component in the second network, and
- the validation unit and the first one-way communication unit can be set up on a third component.

In one advantageous embodiment of the transmission apparatus, the first one-way communication unit and the validation unit can each be set up on a separate component.

A component, in particular a network component, can in particular be in the form of a hardware component. A component can in particular comprise a processor.

A processor can in particular be a main processor (central processing unit, CPU), a microprocessor or a microcontroller, for example an application-specific integrated circuit or a digital signal processor, possibly in combination with a memory unit for storing program commands, etc. A processor can for example also be an IC (integrated circuit) or a multi-chip module, in particular an FPGA (field programmable gate array) or an ASIC (application-specific integrated circuit), an SoC (system on chip), a graphics processor GPU (graphics processing unit), a processor for evaluating a neural network such as for example a TPU (tensor processing unit) or a DSP (digital signal processor). The processor can have one or more computing cores (multi-core). A processor can also be understood to mean a virtualized processor or a soft-CPU. It can for example also be a programmable processor that is equipped with configuration steps for carrying out the aforementioned method according to embodiments of the invention or is configured with configuration steps such that the programmable processor implements the inventive features of the method or other aspects and subaspects of embodiments of the invention. The processor can have tamper protection for protecting against physical manipulations, e.g. tamper sensors for detecting physical attacks.

In addition, embodiments of the invention relates to a computer program product (non-transitory computer readable storage medium having instructions, which when executed by a processor, perform actions) that is loadable directly into a programmable computer, comprising program code portions suitable for performing the steps of a computer-implemented method according to embodiments of the invention.

A computer program product, such as for example a computer program means, can be provided or supplied for example as a storage medium or data carrier, such as for example as a memory card, USB stick, CD-ROM, DVD or else in the form of a downloadable file from a server in a network.

BRIEF DESCRIPTION

Some of the embodiments will be described in detail, with references to the following Figures, wherein like designations denote like members, wherein.

DETAILED DESCRIPTION

In particular, the exemplary embodiments below merely show exemplary realization options for how in particular such realizations of the teaching according to embodiments of the invention might look, since it is impossible and also not practical or necessary for comprehension of embodiments of the invention to cite all of these realization options.

Moreover, in particular a (relevant) person skilled in the art, with knowledge of the method, is of course aware of all routine possibilities for realizing embodiments of the invention in the prior art, and so there is no need in particular for independent disclosure in the description. In particular, these customary realization variants known to a person skilled in the art can be realized exclusively by hardware (components) or exclusively by software (components). Alternatively, and/or additionally, a person skilled in the art, within the scope of his/her expert ability, can choose to the greatest possible extent arbitrary combinations, according to embodiments of the invention, of hardware (components) and software (components) in order to implement realization variants according to embodiments of the invention.

Figure 1:
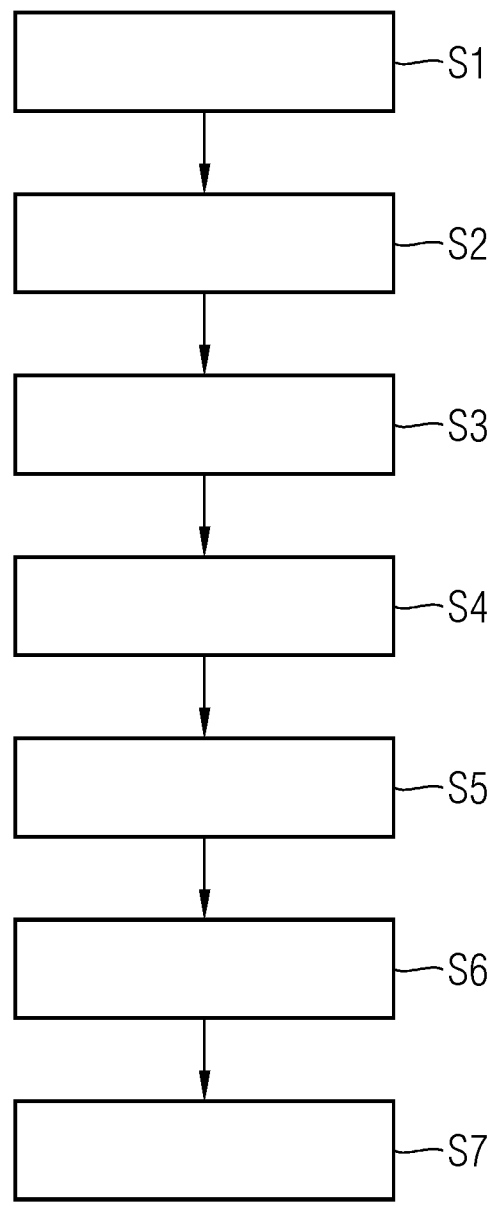
FIG. 1 shows a flowchart for a method according to embodiments of the invention.

FIG. 1 shows a flowchart for a computer-implemented method according to embodiments of the invention for data transmission between a first network having a high security requirement, such as e.g. an industrial control network, and a second network having a low security requirement, such as e.g. a monitoring network. The method can be performed by means of a transmission apparatus according to embodiments of the invention as depicted in exemplary fashion in FIGS. 2 and 3.

By way of example, sensor data from an industrial control network can be transmitted to a monitoring network for the purpose of monitoring or analyzing the control network. In this case, in particular the communication between the networks is supposed to be unidirectional, so that in particular just permitted data traffic from the monitoring network to the industrial control network is approved.

In step S1, a first session is set up for data transmission between the first and second networks. In particular, the first session is set up between the transmitting unit in the first network and the receiving unit in the second network.

In step S2, a first data packet, e.g. a control data packet, is conveyed from the transmitting unit of the first network to a first one-way communication unit, which is arranged between the first and second networks, and is forwarded from there to the second network. A control data packet comprises for example information pertaining to the transmission of, pertaining to the performance of an acknowledgement of receipt for and/or pertaining to a completeness check on the transferred payload data.

The first one-way communication unit can in particular be in the form of a data diode or in the form of an eavesdropping device and serves to realize a unidirectional data transmission from the first to the second network.

Following transmission of the first control data packet, it is possible, on acceptance of the first control data packet by the receiving unit in the second network, for at least one payload data packet comprising payload data to be conveyed from the first to the second network. To this end, step S3 of the method first involves a second session and a third session being set up between the first and second networks, wherein, in step S4, a further data packet, for example a control data packet, is conveyed via a one-way communication unit and a validation unit to the second network.

The second session is set up between the transmitting unit in the second network and the receiving unit, which is associated with the validation unit and can in particular be set up on a common component. When all data packets of the session have been received, they are forwarded from the receiving unit to the validation unit. In this manner, validation of the data packets is merely attained per session.

In the validation unit, the control data packet is validated on the basis of a prescribed rule, step S5. Only data traffic from the second to the first network is checked. The rule is used to stipulate whether a data packet is permitted and can pass, i.e. validation is positive, or is rejected, i.e. negative validation. In the event of positive validation, step S6, the third session is set up between a transmitting unit, which is associated with the validation unit and can in particular be set up on a common component, and the control data packet is transmitted from the validation unit to a receiving unit in the first network.

By way of example, the positively validated control data packet can comprise information about the accepted data transmission. This information is returned to the first network. Subsequently, a data transmission of payload data from the first to the second network can be started, step S7. The payload data can subsequently be forwarded from the receiving unit in the second network to an application.

In the event of negative validation of the control data packet conveyed from the first network, the validation unit can issue a further control data packet that can be conveyed both to the first and to the second network.

Figure 2:
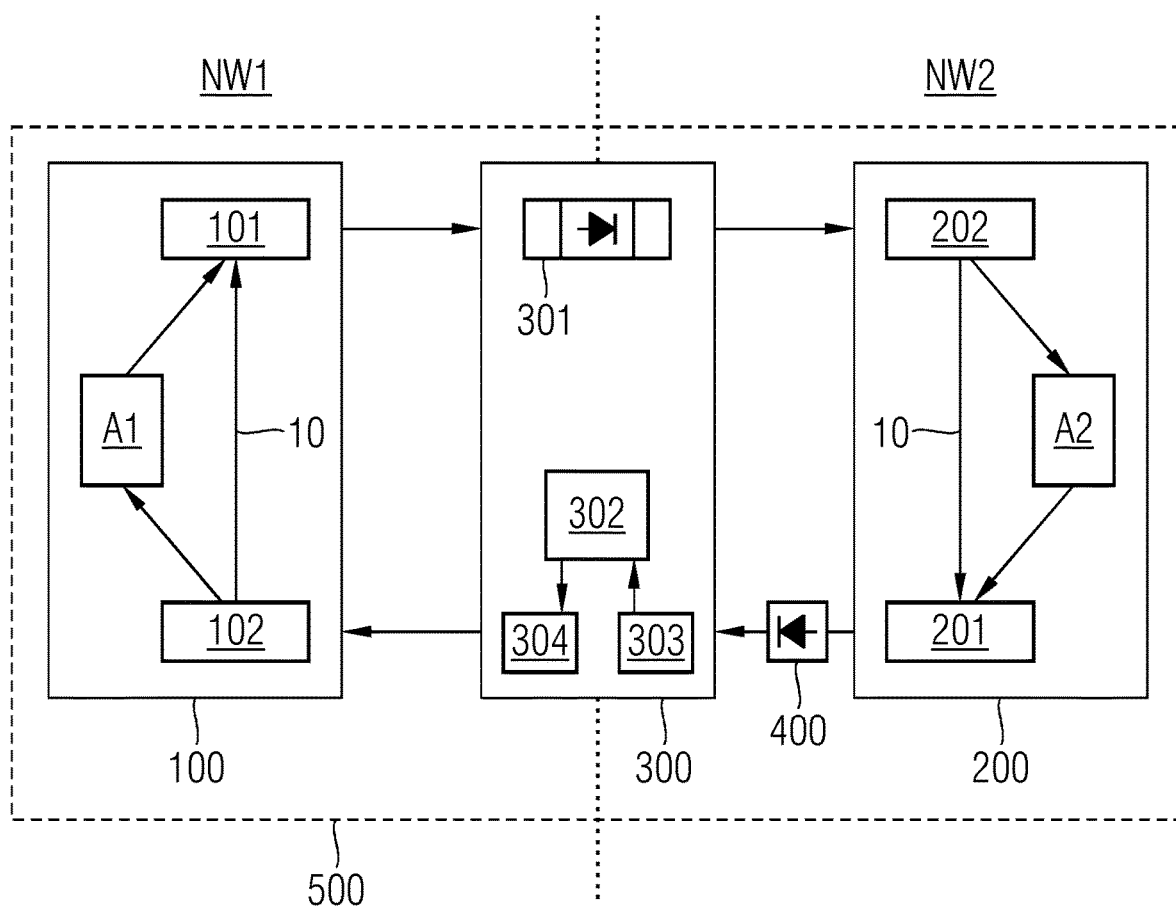
FIG. 2 shows a schematic depiction of a transmission apparatus according to embodiments of the invention.

FIG. 2 uses a block diagram to show a variant of the transmission apparatus 500 according to embodiments of the invention. The transmission apparatus 500 can in particular consist of three separate hardware components 100, 200 and 300, wherein the first component 100 is arranged in the first network NW1 having a high security requirement, the second component 200 is arranged in the second network NW2 having a lower security requirement and the third component 300 is arranged between the two networks NW1, NW2.

The first component 100 comprises a first receiving unit 102 and a first transmitting unit 101, e.g. a server 102 and a client 101. The receiving unit 102 and the first transmitting unit 101 can interchange data. In particular, acknowledgement messages 10 can be transmitted in this manner. The first receiving unit 102 and the first transmitting unit 101 can communicate with an application A1 in the first network NW1. An application A1 can generate or retrieve payload data, for example. In particular, these payload data, e.g. sensor data, can be conveyed from the application A1 to the transmitting unit 101.

The second component 200 comprises a second receiving unit 202 and a second transmitting unit 201, e.g. a server 202 and client 201. These can in particular interchange acknowledgement messages 10. In addition, the second receiving unit 202 and the second transmitting unit 201 can interchange data packets with an application A2 in the second network.

The third component 300 comprises a first one-way communication unit 301, which can in particular be realized as a data diode, a third receiving unit 303, a third transmitting unit 304 and a validation unit 302. The third receiving unit 303 and the third transmitting unit 304 are in particular associated with the validation unit 302.

The first one-way communication unit 301 is designed to realize a data traffic from the first network NW1 to the second network NW2 unidirectionally. The first one-way communication unit 301 merely forwards data packets, preferably without altering them.

The validation unit 302 validates data packets that are sent from the second network NW2 to the first network NW1 on the basis of at least one prescribed rule. The data packets are furthermore transmitted from the second network NW2 to the first network NW1 via a second one-way communication unit 400, e.g. a data diode, which can for example be arranged between the second and third components.

Alternatively (not shown), the second one-way communication unit 400 can be arranged between the third component 300 and the first component 100, wherein it manages the data transmission from the second network NW2 to the first network NW1. As a further alternative, it is also possible for two one-way communication units to be used for the data transmission from the second NW2 to the first NW1 network, wherein one one-way communication unit can be arranged between the second component 200 and the third component 300 and the other one-way communication unit can be arranged between the third component 300 and the first component 100.

In a further variant, the second one-way communication unit 400 can comprise the third receiving unit 303 and/or the third transmitting unit 304 and/or the validation unit 302 (not depicted), or the units can be realized in one unit.

A data transmission with acknowledgement of receipt from the first network NW1 to the second network NW2, wherein an acknowledgement is returned via the validation unit, is shown in exemplary fashion by means of arrows and is explained in more detail with reference to FIG. 7.

Figure 3:
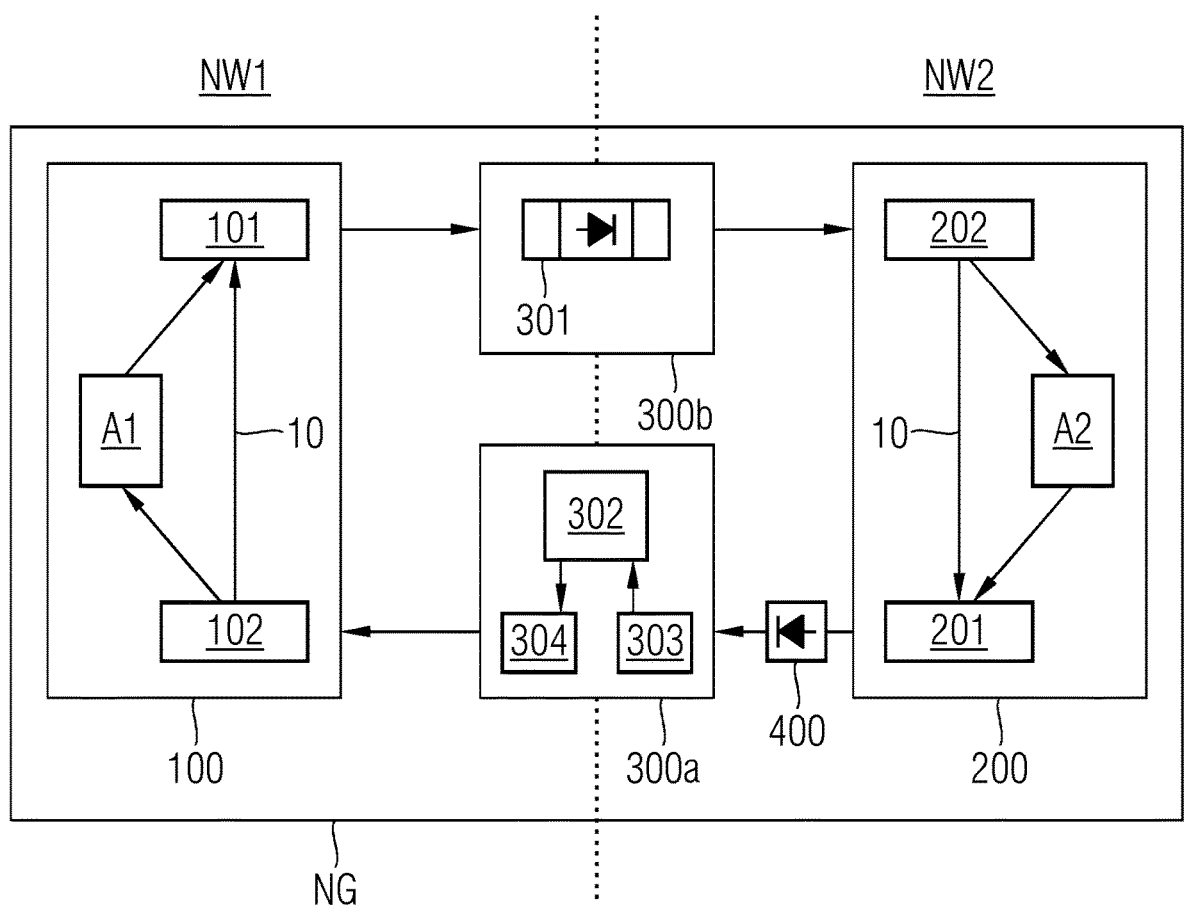
FIG. 3 shows a schematic depiction of a further transmission apparatus according to embodiments of the invention.

FIG. 3 shows a further embodiment of a transmission apparatus 500 according to embodiments of the invention. In this instance, the third component is realized as two separate components 300a, 300b. This separation of the two unidirectional links is advantageous because there is no provision for communication between the two components 300a, 300b. In this manner, the unidirectional data transmission from the first network NW1 to the second network NW2 can proceed via one separate third component 300b and the unidirectional data transmission from the second network NW2 to the first network NW1 can proceed via the other separate third component 300a.

Figure 4:
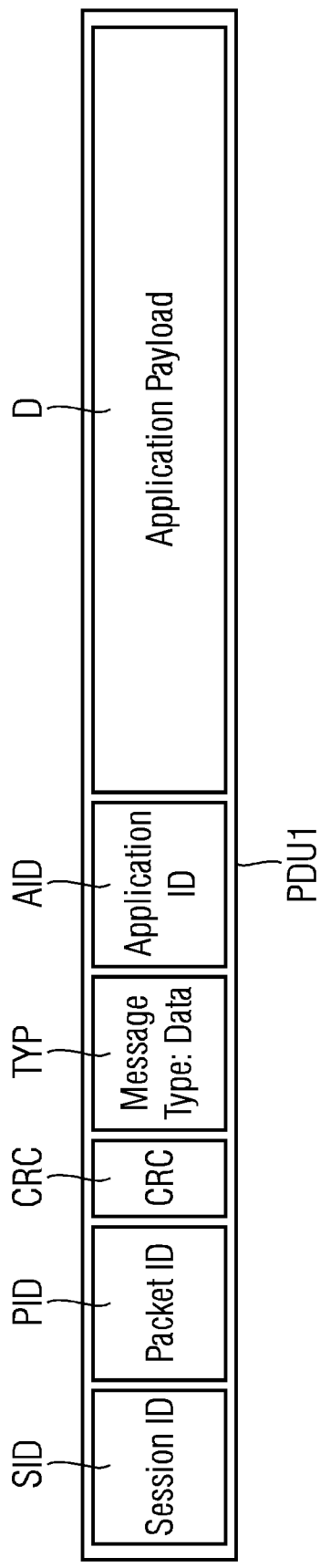
FIG. 4 shows a schematic depiction of a payload data packet.

FIG. 4 schematically shows an exemplary design of a payload data packet PDU1. A payload data packet PDU1 comprises payload data D and a session identifier SID. Additionally, a payload data packet PDU1 can comprise a data packet identification identifier PID, a checksum CRC of the data packet, type information TYP and/or an application identification number AID.

The session identifier SID assigns the data packet to a specific session. The data packet identification identifier PID uniquely identifies the data packet within a packet sequence of a session. The checksum CRC can be a checksum of the entire data packet. The type information TYP indicates the type of the data packet, in particular "DATA" for "payload data packet". The application identification number AID indicates the type of the application associated with the payload data.

Figure 5:
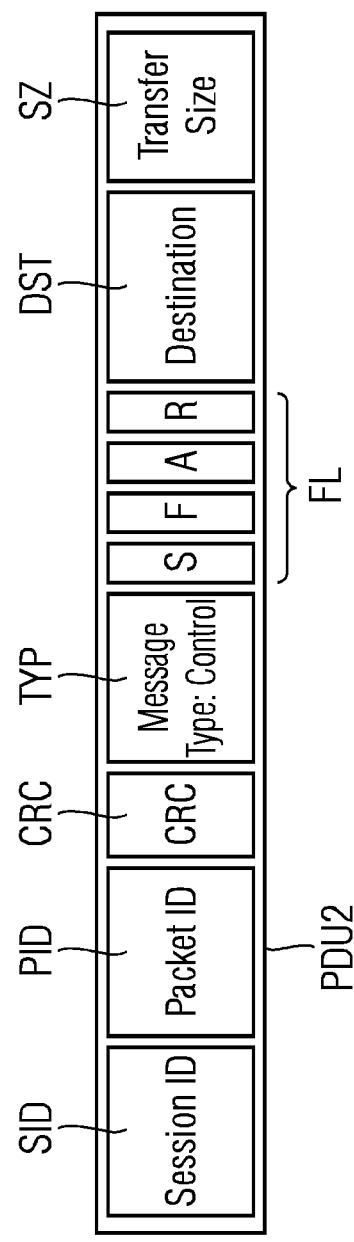
FIG. 5 shows a schematic depiction of a control data packet.

FIG. 5 schematically shows an exemplary design of a control data packet PDU2. A control data packet PDU2 comprises a session identifier SID, a data packet identification identifier PID and transmitter and/or receiver information DST. Additionally, the control data packet PID2 can comprise a checksum CRC of the control data packet, a data packet identification identifier PID, type information TYP, at least one flag FL and/or information SZ about the size of the data transmission of the respective session. The type information can in particular comprise "CONTROL" for "control data packet". The flag can in particular be set to "S" for setting up a new session, "F" for finishing a session, "A" for acknowledging a session or "R" for terminating a session. The flag can be used by a receiving unit or transmitting unit to detect what type of control data packet PDU2 is involved. The flags "S" and "F" can in particular be used by a transmitter. The flags "A" and "R" can be used both by a transmitter and a receiver. The information SZ about the size of the data transmission of the respective session is in particular available only when a session is set up.

Figure 6:
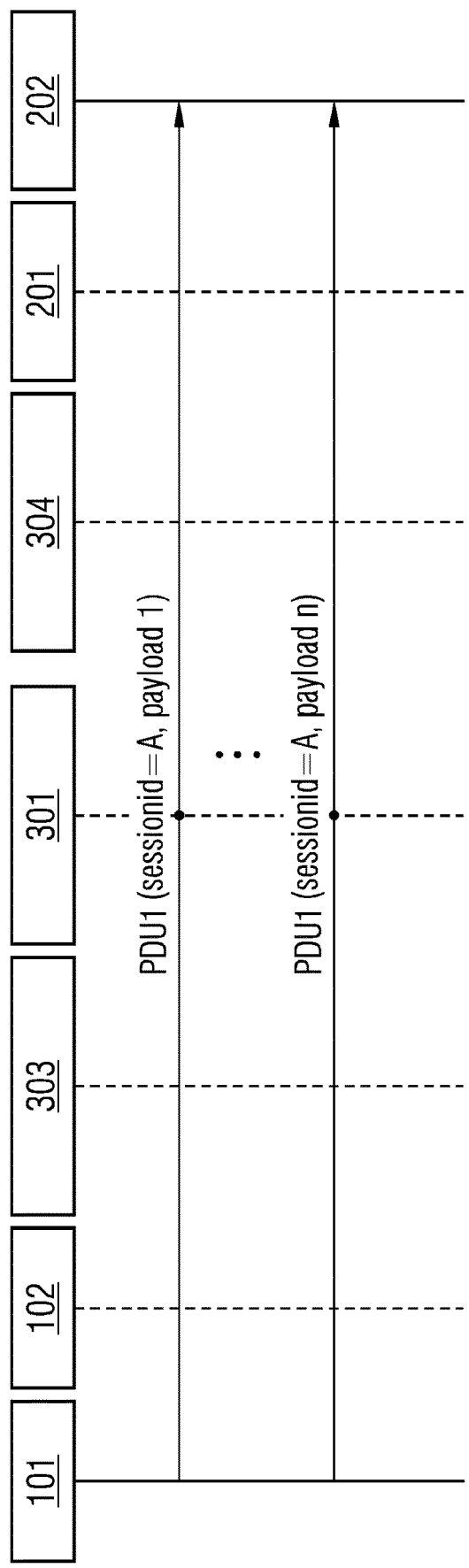
FIG. 6 shows an exemplary embodiment of a method according to embodiments of the invention as a sequence diagram.

FIG. 6 shows a sequence diagram for a data transmission without acknowledgement of a data transmission. The transfer protocol according to embodiments of the invention, allows a data transmission from one to the other network to be performed, with just one session being set up and just at least one payload data packet being transmitted.

A data transmission without an acknowledgement is in particular realized without conveying a control data packet. In this variant, payload data packets can be conveyed from one network to the other network without prior transmission of a control data packet.

Following setup of a session, a payload data packet PDU1 can be conveyed directly to the receiver. Without acknowledgement, a completeness check for the conveyed payload data cannot be performed, for example. By way of example, a client 101 in the first network sets up a first session with the second network. The server 102 is used to convey the payload data packet to the second network. To this end, the data packet is conveyed to a client 303 on the third component, is forwarded from the first one-way communication unit 301 to the server 304 of the third component and is conveyed from the latter, via the server 201 of the second network, to the client 202 of the second network. In other words, the client 101 in the first network starts the transmission of payload data to the client 202 without the conveyance of a control data packet. The first one-way communication unit 301 forwards the payload data packets without a check or modification.

For a transmission from the second network to the first network without acknowledgement (not depicted), a data packet is checked in the validation unit. To this end, two individual sessions are set up using an intermediate step: a session from the client 301 in the second network to the client 303 on the third component, a validation in the validation unit 302 and a further session from the server 304 of the third component to the server 102 of the second network.

Figure 7:
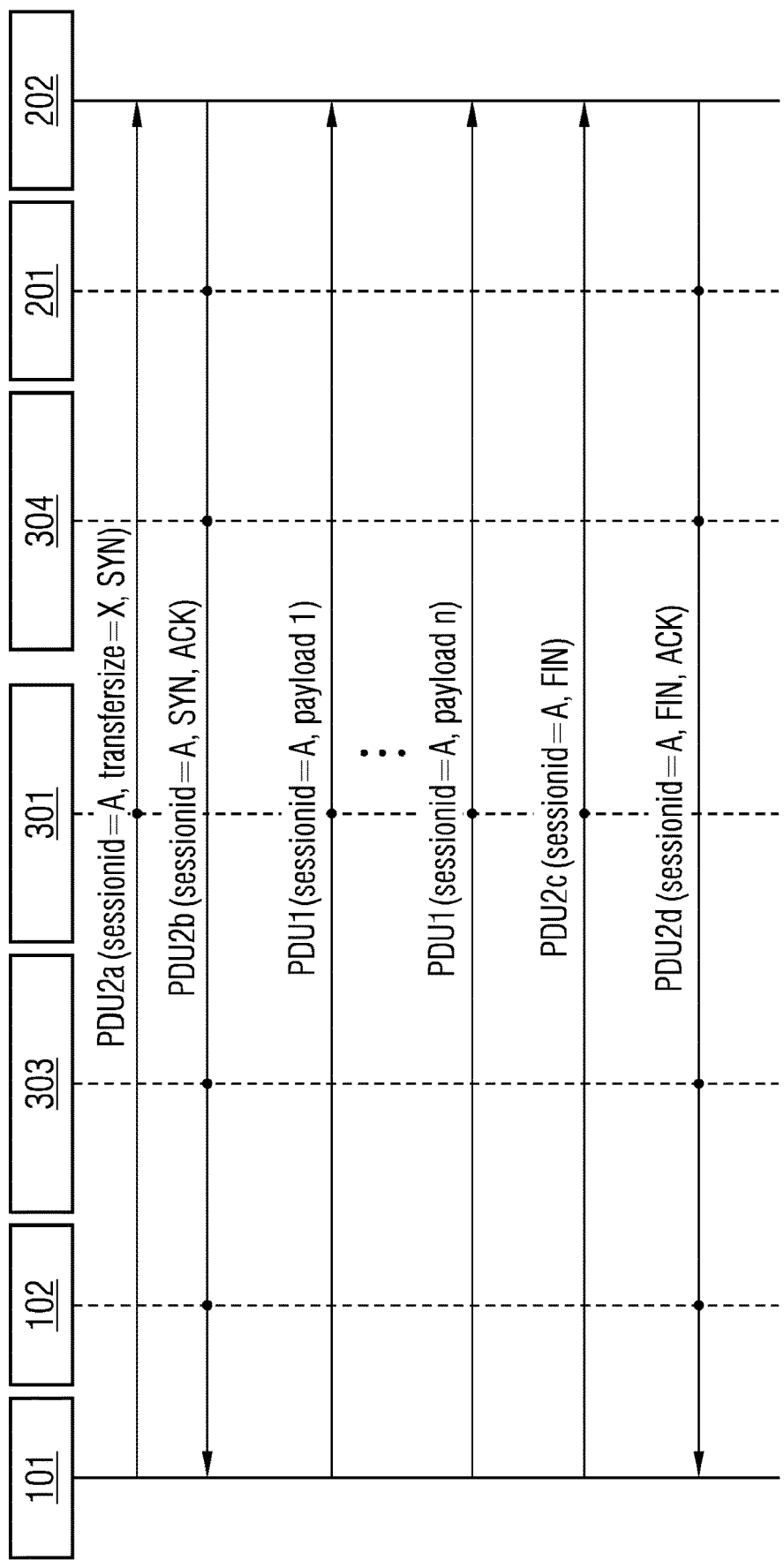
FIG. 7 shows a further exemplary embodiment of a method according to embodiments of the invention as a sequence diagram.

FIG. 7 shows a sequence diagram for a payload data transmission from the first network to the second network with acknowledgement of the data transmission. First, following session setup, a first control data packet PDU2a containing data transmission information "SYN" is conveyed from the client 101 of the first network to the server 202 of the second network. The request is checked by the server 202 for acceptance, and acceptance results in a second control data packet PUD2b, which comprises an acknowledgement identifier "A" or "ACK", being conveyed from the server 202 to the client 102 of the first network. To this end, the second control data packet PDU2b is first forwarded from the server 202 to the client 201 of the second network and from the client 201 to the server 304 of the third component. The second control data packet PDU2b passes through the validation unit 301 and is validated there on the basis of a rule. Successful validation results in the second control data packet PDU2b being conveyed from the client 303 of the third component to the server 102 of the first network. The server 102 of the first network forwards the second control data packet PDU2b to the client 101 of the first network.

As soon as the acknowledgement is available with the client 101 in the first network, the client can transmit at least one payload data packet PDU1 via the first one-way communication unit to the server 202 of the second network. In particular, just the payload data packets PDU1 that have the correct associated session identifier for the existing session are transmitted. As soon as all payload data packets of the session have been transmitted, the client 101 sends a third control data packet PDU2c comprising information about the end of the session, i.e. containing an identifier "F" or "FIN", to the server 202 in the second network. As soon as the server 202 has received the third control data packet PDU2c, it conveys a fourth control data packet PDU2d to the client 101 in the first network. The first control data packet PDU2a and the third control data packet PDU2c can be used by the server 202 in the second network to ascertain a completeness of the transmitted payload data packets PDU1. By way of example, this can be checked on the basis of the respective checksum of the control data packets PDU1a, PDU1c. The result of this check can for example be conveyed to the first network in the fourth control data packet PDU2d. If for example the conveyed payload data packets PDU1 are not complete or are defective, a fresh transmission can be initiated in this manner.

A client or a server can terminate a transmission at any time by conveying a control data packet PDU2 comprising the applicable session identifier and, if need be, additionally information. Receipt of this control data packet and hence finishing of the session must be acknowledged by the receiver by returning a further control data packet to the transmitter.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A computer-implemented method for transmitting data between a first network having a high security requirement and a second network having a low security requirement, the method comprising:
   setting up a first session from the first network to the second network and transmitting a first control data packet over the first session from a transmitting unit in the first network via a first one-way communication unit arranged between the first network and the second network, to a receiving unit in the second network, the first control data packet being transmitted without being subjected to validation for receipt by the second network from the first network;

in response to receipt of the first control data packet in the second network by the receiving unit, setting up a second session from the second network to the first network and transmitting a second control data packet and at least one payload data packet from a transmitting unit in the second network over the second session via a second one-way communication unit to a validation unit arranged between the first network and the second network;

validating the second control data packet in the validation unit on the basis of a prescribed rule of a set of rules, wherein the at least one payload data packet is not individually validated on the bask of any of the set of rules; and in response to the second control data packet being positively validated by the validation unit, setting up a third session; transmitting the second control data packet from the validation unit to a receiving unit in the first network over the third session, and transmitting, the at least one payload data packet over the third session, wherein the at least one payload data packet is transmitted based on the validation of the second control data packet by the validation unit.

2. The computer-implemented method as claimed in claim 1, wherein at least one data packet is transmitted at least one of between the receiving unit and the transmitting unit in the first network and between the receiving unit and the transmitting unit in the second network.

3. The computer-implemented method as claimed in claim 1, wherein, if the validation of the second control data packet in the validation unit has a negative outcome, a third control data packet is issued by the validation unit and the third control data packet is transmitted via the first network to the second network.

4. The computer-implemented method as claimed in claim 1, wherein the payload data packet of the third session is assigned a unique session identifier.

5. The computer-implemented method as claimed in claim 1, wherein a control data packet is assigned to at least one of a unique session identifier, a data packet identification identifier and transmitter and receiver information.

6. The computer-implemented method as claimed in claim 1, wherein a data transmission involves a control data packet being transmitted before the transmission of a payload data packet.

7. The computer-implemented method as claimed in claim 6, wherein acceptance of the control data packet results in a payload data packet being transmitted and nonacceptance of the control data packet results in the data transmission being terminated and just a further control data packet being transmitted back.

8. The computer-implemented method as claimed in claim 1, wherein a data transmission from the first network to the second network involves the first control data packet being transmitted from the first network to the second network, the first control data packet being checked in the second network for acceptance, wherein, if the first control data packet is accepted, the second control data packet is transmitted from the second network to the validation unit, validated there and, in the event of positive validation, transmitted to the first network, at least one payload data packet is transmitted from the first network to the second network, and a third control data packet is transmitted from the first network to the second network.

9. The computer-implemented method as claimed in claim 8, wherein the first and third control data packets are used to check a completeness of the transmitted payload data packet in the second network, and a fourth control data packet comprising the result of the check is transmitted to the first network.

10. A transmission apparatus for transmitting data between a first network having a high security requirement and a second network having a low security requirement, comprising a first receiving unit and a first transmitting unit, which are each arranged in the first network;

a second receiving unit and a second transmitting unit, which are each arranged in the second network;

a first one-way communication unit, which is arranged between the first network and the second network and set up to transmit a data packet in the event of a first data transmission from the first transmitting unit to the second receiving unit, the data packet being transmitted without being subjected to validation for receipt by the second receiving unit;

a second one-way communication unit, arranged between the second network and the first network, for a second data transmission from the second to the first network, the second data transmission including a control data packet and a payload data packet; and a validation unit, which is arranged between the second and first networks and set up to validate the control data packet on the basis of a prescribed rule of a set of rules in the event of the second data transmission from the second transmitting unit to the first receiving unit, wherein the payload data packet is not individually validated on the basis of any of the set of rule, and, when the control data packet is positively validated, set up a third data transmission and transmit the control data packet and the payload data packet to the receiving unit in the first network as part of the third data transmission, wherein the payload data packet is transmitted as part of the third data transmission based on the validation of the control data packet by the validation unit.

11. The transmission apparatus as claimed in claim 10, wherein the first receiving unit and the first transmitting unit are set up on a first component in the first network, the second receiving unit and the second transmitting unit are set up on a second component in the second network, and the validation unit and the first one-way communication unit are set up on a third component.

12. The transmission apparatus as claimed in claim 11, wherein the first one-way communication unit and the validation unit are each set up on a separate component.

13. A computer program product, comprising a computer readable hardware storage device having computer readable program code stored therein, said program code executable by a processor of a computer system to implement a method for transmitting data between a first network having a high security requirement and a second network having a low security requirement, the method comprising:

setting up a first session between the first network and the second network and transmitting a first control data packet over the first session from a transmitting unit in the first network via a first one-way communication unit arranged between the first network and the second network, to a receiving unit in the second network, the first control data packet being transmitted without being subjected to validation for receipt by the second network from the first network;

in response to receipt of the first control data packet in the second network by the receiving unit, setting up a second session between the second network and the first network and transmitting a second control data packet and at least one payload data packet from a transmitting unit in the second network over the second session via a second one-way communication unit to a validation unit arranged between the first network and the second network;

validating the second control data packet in the validation unit on the basis of a prescribed rule of a set of rules, wherein the at least one payload data packet is not individually validated on the basis of any of the set of rules; and in response to the second control data packet being positively validated by the validation unit, setting up a third session and transmitting the second control data packet from the validation unit to a receiving unit in the first network over the third session, and transmitting the at least one payload data packet over the third session based on the positive validation of the second control data packet by the validation unit.

* * * * *